Nov. 12, 1957  A. DE SIMONE  2,812,841
CLUTCH
Filed Sept. 7, 1954  2 Sheets-Sheet 1
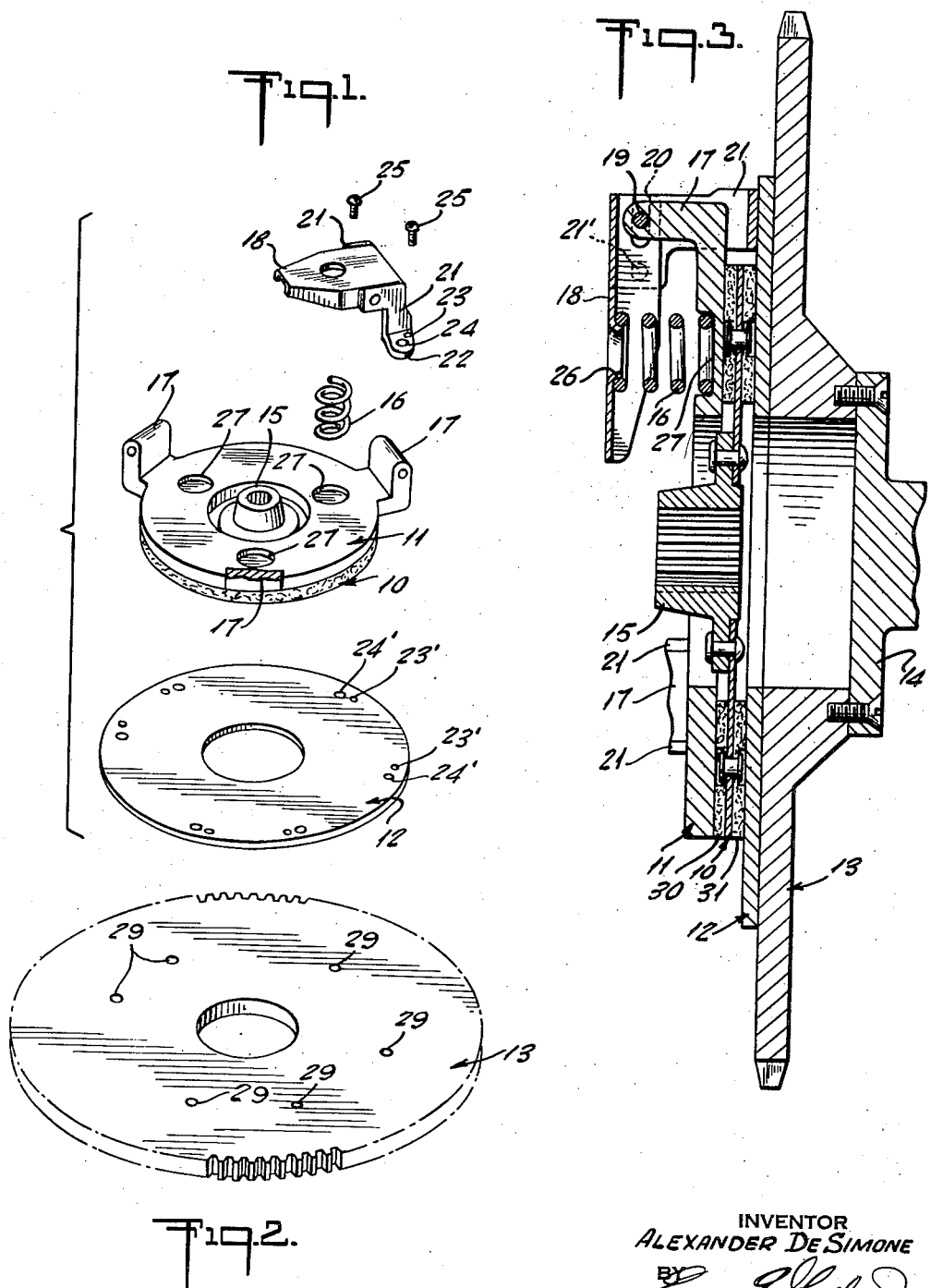
INVENTOR
ALEXANDER DE SIMONE
BY
ATTORNEY

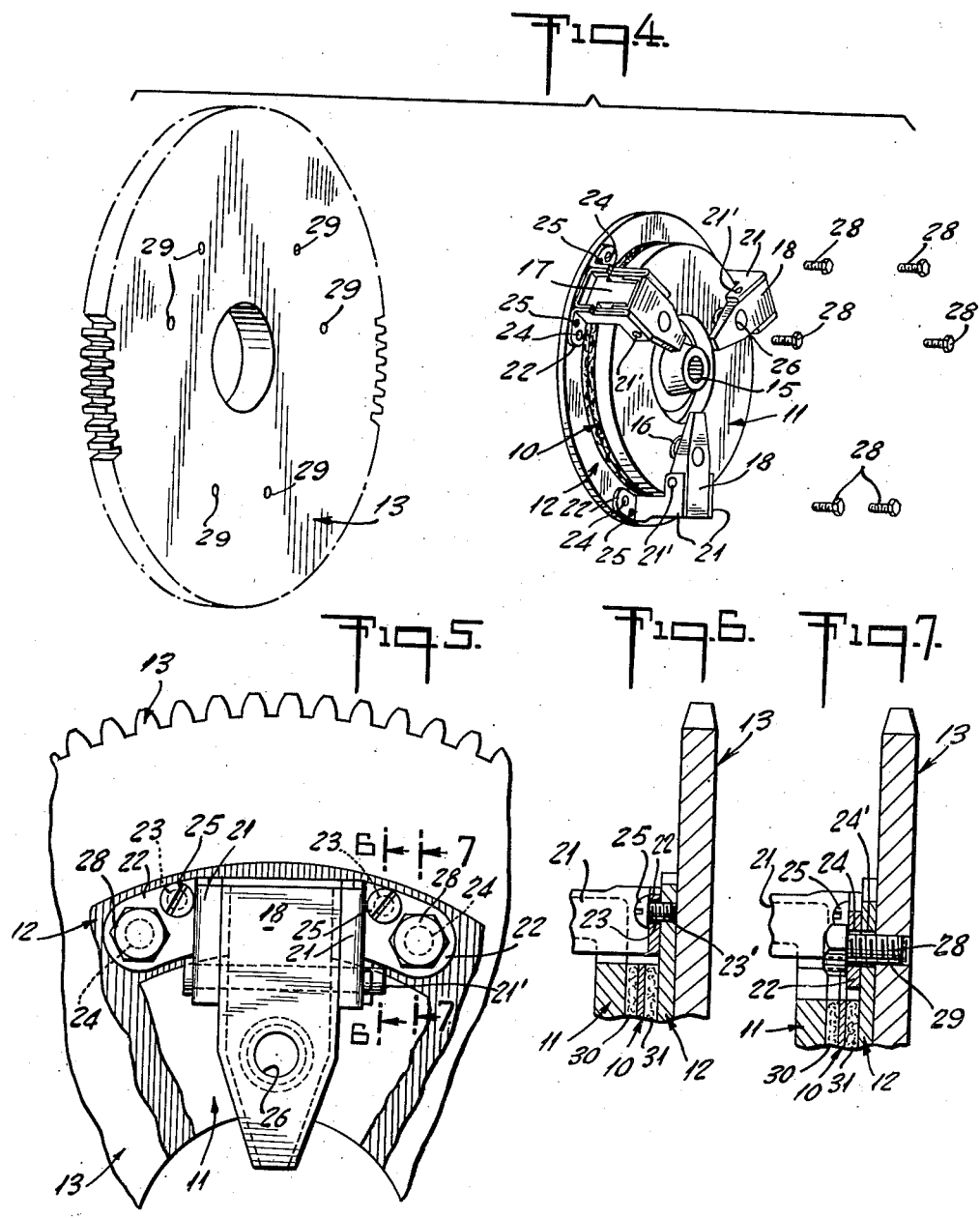

United States Patent Office 2,812,841
Patented Nov. 12, 1957

2,812,841
CLUTCH
Alexander De Simone, Middle Village, N. Y.

Application September 7, 1954, Serial No. 454,368

3 Claims. (Cl. 192—68)

This invention relates to clutches and more specifically to manually and automatically operated disc clutches of the type used on motor cars, trucks and other similar vehicles to engage and disengage the primary source of power from the wheels or other driving means.

Automotive vehicles, and particularly those embodying manually operated clutches are usually arranged with the flywheel acting as part of the clutch assembly. The flywheel is of itself a relatively heavy object and is attached directly to the crankshaft of the power plant or motor. The members forming the clutch proper are a pressure plate that is adapted to rotate with the flywheel and a clutch plate of relatively soft material disposed between the pressure plate and flywheel and connected with the drive shaft. Spring means acting on the pressure plate compresses the clutch plate between it and the flywheel and a pedal or other actuator is provided to counteract the action of the spring to effect disengagement of the clutch members.

Clutches must be rebuilt or repaired when the clutch plate wears out and in many cases irregularities develop on the surfaces of both the pressure plate and flywheel. Such irregularities prevent proper operation of the clutch and cause new clutch plates to wear rapidly. While in the normal case the pressure plate is replaced, the flywheel is seldom replaced because of the high labor and replacement costs. As a result the replacement of worn clutch and pressure plate does not effect a satisfactory result.

Accordingly, one object of the invention resides in the provision of a new and improved clutch for motor driven vehicles and other purposes wherein all active elements of the clutch are contained within a unitary structure that is easy to install and replace. Clutch replacement costs are therefore materially reduced and the replaced clutch will provide long life and smooth operation equalling if not superior to that of the original clutch. While the invention is particularly useful in replacement clutch assemblies, it will become evident that material savings and improved clutch operation can also be attained by its employment in new car manufacture.

Another object of the invention resides in the provision of a clutch so arranged and designed as to enable the attainment of smoother and more uniform engagement than that attainable with present clutches of the type used in automotive equipment. This is accomplished through the interposition of means that reacts with the other elements of the clutch to produce a rate of engagement under normal operation of the clutch operating lever of such a nature as to prevent jerking of the vehicle or other apparatus being driven. This is particularly important when the clutch is to be engaged under load.

The above and other objects and advantages of the invention will become more apparent from the following description and accompanying drawings forming part of this application.

In the drawings:

Fig. 1 is an exploded perspective view of one form of clutch embodying the invention;

Fig. 2 is a perspective view of the flywheel of an automotive vehicle adapted to carry the clutch shown in Fig. 1;

Fig. 3 is a cross-sectional view of the assembled clutch elements shown in Fig. 1;

Fig. 4 is a perspective view of the unitary clutch assembly in accordance with the invention and before attachment to the flywheel;

Fig. 5 is an elevational view of a fragmentary part of the assembly shown in Fig. 3; and Figs. 6 and 7 are cross sectional views of Fig. 5 taken along the lines 6—6 and 7—7 thereof.

While a specific form of automotive clutch is illustrated in the figures it will become apparent as the description proceeds that this invention may be applied to all types of clutches used in connection with automobiles, trucks, boats and other devices.

The clutch in accordance with the invention includes three basic elements namely the composite clutch disc 10, a relatively rigid pressure plate 11 and a secondary pressure plate 12. In operation of the clutch the pressure plates 11 and 12 are disposed on opposite sides of the clutch disc 10 and urged into pressure engagement therewith to transmit power from the pressure plates to the clutch disc 10. More specifically and with reference to automotive applications, the secondary pressure plate is of relatively thin section and lies flat against the flywheel 13 carried by the crankshaft 14 of a motor. The clutch plate 10, having a splined hub 15 for receiving the shaft to be driven, is placed against the pressure plate 12. The pressure plate 11 is positioned in overlying relationship with the clutch disc 10 and the three elements are held in presure engagement by the spring 16.

In the specific embodiment of the invention the pressure plate 11 is provided with three lugs 17 extending outwardly thereof and pivotally attached to the outer ends of three radially disposed levers or fingers 18 by engagement of a pin 19 with suitable slots 20. These fingers are each pivoted to a bracket member 21 by a pin 21' positioned substantially parallel to the pin 19 but displaced inwardly thereof. The bracket 21 has two outstanding lugs 22 each having two holes 23 and 24 which correspond to the sets of holes 23' and 24' in the secondary pressure plate 12 as may be observed in Fig. 1. Each of these brackets is secured to the plate 12 by a pair of screws 25 which preferably slidably engage the holes 23 and threadably engage the holes 23' in the plate 12. The springs 16 are disposed between the inner ends of the fingers 18 and the pressure plate 11 and held in place by engagement with an inwardly formed ridge 26 on each finger 18 and an aligned recess 27 in the pressure plate.

With the foregoing structure, the springs 16 react between the pressure plate 11 and the fingers 18 tilting the fingers about the pivot 21'. In so doing the pressure plate 11 is urged into engagement with the clutch disc 10 and the latter engages the inner surface of the secondary plate 12. The completely assembled clutch according to the invention is shown more clearly in Fig. 4 of the drawings ready for attachment to the flywheel 13. It is to be noted that with the elements in this assembled position, the clutch disc 10 is precisely aligned with the other clutch members so that in installation, the entire assembly is inserted in one piece and eliminates the problems entailed in conventional practice wherein the clutch disc and pressure plate 11 must be aligned during installation on the flywheel 13.

The installation of the assembled clutch elements as shown in Fig. 4 to the flywheel is accomplished by merely inserting the bolts 28 through the openings 23 and 23' in the lugs 22 and plate 12 respectively and threadably engaging them with the openings 29 in the flywheel 13 as shown in Figs. 5 and 7.

While the ease of installing a replacement clutch in accordance with the invention constitutes an important advantage, more important advantages result by way of highly improved operation and lower maintenance costs. Conventional automotive clutches as is well-known generally utilize as the clutch elements, the flywheel 13, clutch disc 10 and the pressure plate 11. Both the flywheel and the pressure plate 11 are relatively heavy, rigid members and in order to attain smooth clutch operation, the clutch disc 10 is made in two parts 30 and 31 coupled by arcuately disposed spring members. This structure is well-known in the art and therefore has not been illustrated. This clutch disc structure is necessary to prevent sudden "grabbing" of the clutch elements one with the other in order to attain smooth engagement. While this system works well as long as the clutch surfaces of both the flywheel 13 and pressure plate 11 are smooth, should one surface become slightly uneven severe "grabbing" results. Normally both surfaces wear in an uneven manner so that replacement of the pressure plate 11 and clutch disc 10 in a conventional clutch does not remedy the faulty clutch operation.

It has been found that through the use of the thin secondary pressure plate 12 one of the operative clutch elements produces unexpectedly smooth and uniform operation. It appears that through the use of discs of a thickness of the order of .07 inch to .1 inch of iron, steel or other similar material secured against the flywheel 13 about the edges thereof, that the central portion tends to flare inwardly a slight degree. This is believed to produce a more desirable logarithmic rate of engagement of the clutch elements so that a smoother more easily controlled clutch action results. This improved operation presents considerably less wear on the clutch disc 10, that is usually of a relatively soft material, and provides longer clutch life. Upon replacement of the clutch the elements 10, 11 and 12 are replaced as a unit which greatly expedites the work and insures perfect operation of the new assembly.

The foregoing advantages have been shown in actual practice wherein clutches in accordance with the invention have been installed in vehicles in which the conventional clutch was replaced several times because of faulty operation. Notwithstanding the unevenness of the flywheel, the utilization of the disc 12, with the central portion deflecting outwardly away from the flywheel 13, does not rely on the uniformity of the flywheel surface for good operation and only flattens against the flywheel when the clutch is in the engaged position as shown in the figures.

While only one embodiment of the invention has been shown and described it is apparent that it may be used with other types of clutches and that changes, alterations and modifications may be made without departing from the true scope and spirit thereof.

What is claimed is:

1. A clutch adapted to be carried by a relatively rigid wheel for the application of power to a shaft comprising a relatively thin plate of readily deflectable material for attachment to said wheel by peripheral attaching means, a clutch disc overlying said plate and including a hub for attachment to the shaft to be driven, a relatively heavy pressure plate overlying said disk and carried by said wheel for movement in synchronism therewith, and means carried at least in part by said relatively thin plate for moving said pressure plate, disk and deflectable plate into and out of engagement one with the others.

2. A clutch for attachment to a relatively rigid flywheel comprising a relatively thin flat plate adapted to overlie one face of said flywheel, a clutch disc including a hub for attachment of a shaft to be driven overlying one surface of said thin plate, a relatively rigid pressure plate overlying said disc and movable toward and away from said thin plate to engage and release the clutch disc, pressure plate supporting means secured to the periphery of said thin plate to hold the pressure plate and thin plate in alignment one with the other and with clutch disc disposed therebetween and means on said supporting means and the periphery of said thin plate for securing said clutch to a flywheel.

3. A clutch according to claim 2 wherein said thin plate, clutch disc and pressure plate are normally held in engagement one with the others and said clutch further includes means for moving the pressure plate out of engagement with said clutch disc.

References Cited in the file of this patent

UNITED STATES PATENTS

| | | |
|---|---|---|
| 1,444,361 | Badois | Feb. 6, 1923 |
| 1,541,411 | Davis | June 9, 1925 |
| 1,767,309 | Ricardo | June 24, 1930 |
| 1,810,361 | Loeffler | June 16, 1931 |
| 1,958,070 | Schmid et al. | May 8, 1934 |
| 2,143,300 | Cole | Jan. 10, 1939 |
| 2,259,933 | Holloway | Oct. 21, 1941 |
| 2,403,322 | Action | July 2, 1946 |

FOREIGN PATENTS

| | | |
|---|---|---|
| 262,162 | Great Britain | Dec. 9, 1926 |